Dec. 8, 1964   J. V. JOHNSTON   3,160,018
ELECTRON GYROSCOPE

Filed Jan. 11, 1963   4 Sheets-Sheet 1

James V. Johnston,
INVENTOR.

James V. Johnston,
INVENTOR.

James V. Johnston,
INVENTOR.

Dec. 8, 1964   J. V. JOHNSTON   3,160,018
ELECTRON GYROSCOPE
Filed Jan. 11, 1963

James V. Johnston,
INVENTOR.

3,160,018
ELECTRON GYROSCOPE
James V. Johnston, 7801 Whitesburg Drive,
Huntsville, Ala.
Filed Jan. 11, 1963, Ser. No. 250,968
8 Claims. (Cl. 74—5)
(Granted under Title 35, U.S. Code (1952), sec. 266)

The invention described herein may be manufactured and used by or for the Government for governmental purposes without the payment of any royalty thereon.

This invention relates to a gyroscope and more particularly to an electron gyroscope.

Conventional gyroscopes have a rotor mounted on a shaft in a housing that is supported by a pair of gimbal rings. The bearings of these gimbals and the rotor shaft cause errors in the output signal of the gyro due to friction between the bearings and the mechanical elements.

In order to eliminate the problems associated with balanced mechanical gyros, I have invented a gyro in which there are no movable mechanical elements; therefore, the problem of friction is eliminated.

In view of these facts, an object of this invention is to provide a gyro that can sense equally as well along two axes.

Another object of this invention is to provide an inexpensive gyro.

A further object of this invention is to provide a gyro in which there are no movable mechanical elements.

A still further object of this invention is to provide a gyro that can be installed similar to a vacuum tube.

Another object of this invention is to provide a gyro in which there is no rotor; therefore, the problems associated with balancing the rotor are eliminated.

Still another object of the invention is to provide a gyro having a long life.

The foregoing and other objects of this invention will become more fully apparent from the following detailed description of the invention and from the accompanying drawings, in which.

Figure 1:
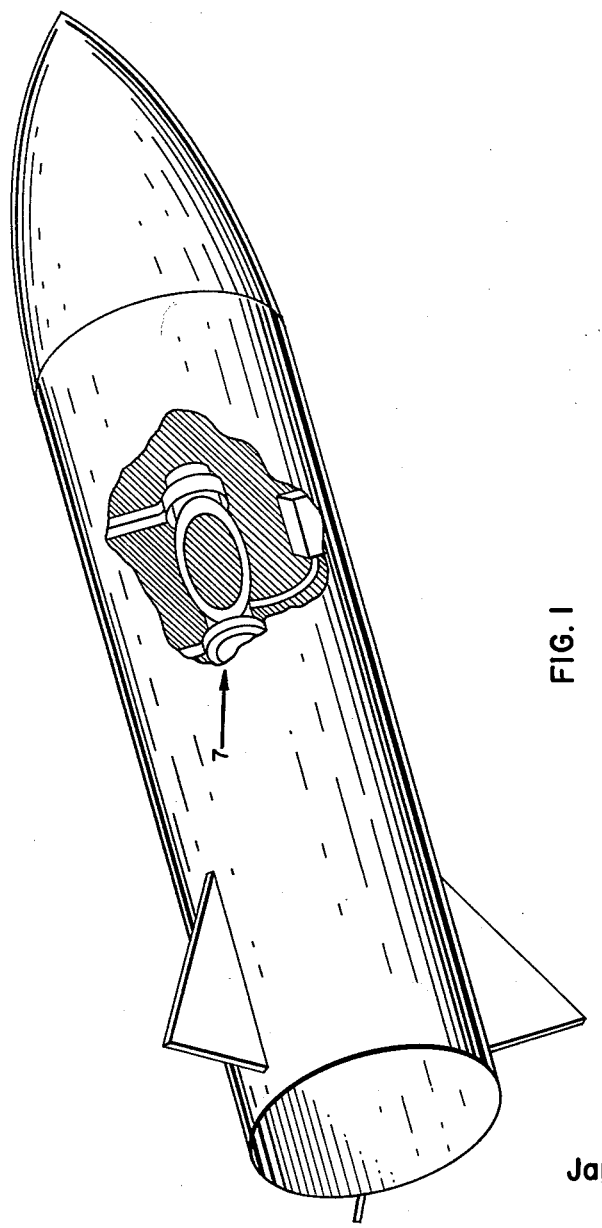
FIGURE 1 is a view, partly in section, of a ballistic missile, or space craft embodying the invention.

Referring now to the drawings wherein like reference characters designate like or corresponding parts throughout the views, there is shown a preferred embodiment of the invention. The numeral 7 designates an electron gyroscope comprising: a hollow non-conductive hermetically sealed toroid 9; a heating coil 11 disposed within said toroid; a potential source 27 for energizing the heating coil; a pool of mercury 13 disposed adjacent the heating coil for generating a cloud of electrons when the heating coil is energized; an accelerating anode 15 diametrically positioned within the toroid relative to the heating coil; a potential source 29 for energizing the accelerating anode to give a velocity to the cloud of electrons; an external winding 17 wound on the toroid; a three phase source 31 for energizing the external winding so as to produce a rotating magnetic field for applying a magnetic force to the electrons to cause the electrons to rotate in a circular path along the means circumferential axis 19 of the toroid; and electrodes 33, 33', 35, 35', 37, 37', 39, and 39' attached to the inner surface of said hermetically sealed toroid for producing an electrical signal responsive to the deviation of the stream of electrons from the mean circumferential axis 19 of the toroid.

The electron gyroscope may be mounted in a ballistic missile, a space craft (as shown in FIGURE 1) or in any device in which conventional gyros may be used. In mounting the electron gyroscope in a space craft as shown in FIGURE 1 conventional clamp on straps may be used.

If it is desired to determine the roll and pitch of the space craft, the X-axis of the gyro would be aligned with the longitudinal axis of the space craft and the Y axis of the gyro would be perpendicular to the longitudinal axis of the space craft. The X and Y axes of the gyro may be reversed and is not necessary that the X and Y axes of the gyro be aligned with the longitudinal axis and the axis perpendicular to the longitudinal axis; however, the best results are obtained when they are in alignment.

Figure 2:
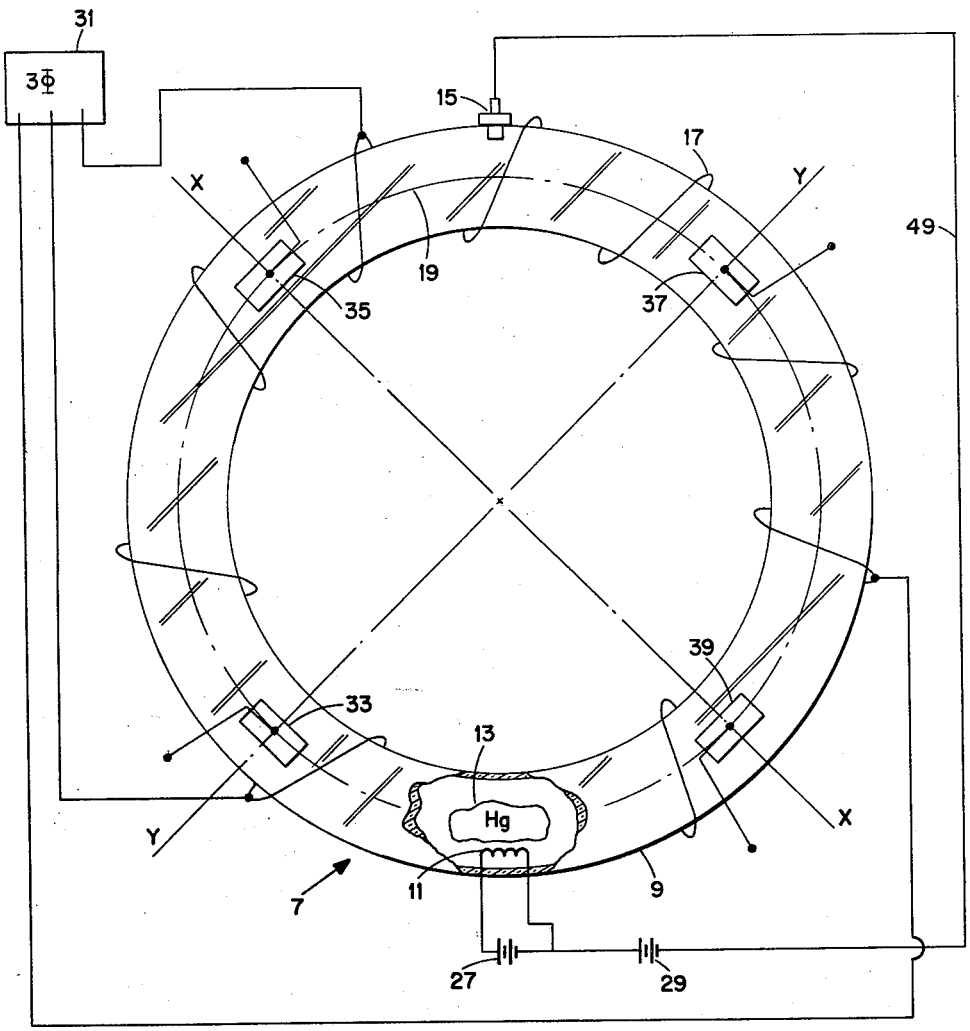
FIGURE 2 is a plan view of a toroidal gyroscope with the electrical circuitry shown in schematic form.

The toroid of the gyroscope may be made of any non-conductive materiel so long as the toroid can be hermetically sealed. In the embodiment shown in FIGURES 2, 3, and 4 the toroid is made of transparent glass. The toroid has heating coil 11 positioned therein and a few drops of mercury 13 are placed inside the toroid prior to evacuation of the air from the toroid. The purpose of the mercury is to provide a materiel which will give off a large quantity of electrons and ions when heated. It is also possible to use some other element such as an inert gas for generating electrons, however, in the particular embodiment shown mercury is used. Potential source 27 is connected across the heating coil and generates a cloud of electrons. In order to cause the electrons and ions to be drawn away from the heater and impart an acceleration to them potential source 29 is connected between the heater and accelerating anode 15.

External winding 17 is energized by a three phase voltage source 31 which causes a rotating magnetic field to be created within the toroid. This magnetic field forces the electrons and ions to flow along means circumferential axis 19 of the toroid when the toroid is stationary. The magnetic field which is produced by the external winding is just strong enough to keep the electrons flowing along the mean circumferential axis in a soft stream. This means that as the toroid is rotated the stream of electrons will deviate from the mean circumferential axis for a short period of time.

Referring back to the acceleration of the electrons, a magnetic field alone will not impart a velocity to an electron. Therefore, the electrons must be accelerated and in my invention the potential difference between the heater and the accelerating anode causes the electrons to be accelerated. Once the electrons have a velocity the rotating magnetic field will cause them to maintain their velocity since charged particles in a magnetic field are under the influence of the magnetic field. If the charged particles try to deviate from the mean circumferential axis they pick up more velocity. Consequently the velocity at which the electrons are rotating is controlled by the rotating magnetic field.

In order to detect the deviation of the electrons or ions from the mean circumferential axis, which deviation is caused by moving the toroid about the X or Y axis or both axes, a plurality of pairs of electrodes are positioned on the inner surface of the toroid along the X and Y axes. There are four pairs of electrodes consisting of upper electrodes 33, 35, 37, and 39 and respective lower electrodes 33', 35', 37', and 39'. In order to detect any movement of the toroid about the X axis two pairs of electrodes 33, 33', 37, and 37' are positioned on the Y axis of the toroid. The two pairs are connected in a bridge circuit so as to detect any difference in current flow between the pairs. Upper electrode 33 is connected to lower electrode 33' at terminal 41 which is in turn coupled to one side of a voltage dividing resistor 43. Electrodes 37 and electrode 37' are connected together at terminal 45 which is in turn connected to the other side of voltage dividing resistor 43. Voltage dividing resistor 43 is center tapped and is connected to the positive side of battery 47 which causes the electrodes to be biased positive. The negative side of battery 47 is connected to conductor 49 which connects battery 29 to the heating circuit. An output signal may be taken across terminals 51 and 53 and according to the magnitude of the signal the rate at which the toroid is rotating about the X axis can be determined. The polarity of the output signal is a direct indication as to whether the toroid is rotating in a clockwise or counter clockwise direction. An indicating device 60, which may be any conventional means such as an oscilloscope, may be used to determine the magnitude and polarity of the output signal.

In order to detect movement of the toroid about the Y axis two pairs of electrodes comprising electrodes 35, 35', 39 and 39' are positioned on the X axis of the toroid. The two pairs are connected in a bridge circuit so as to detect any difference in current flow between the two pairs of electrodes. Upper electrode 35 is connected to lower electrode 35' at terminal 55 which is in turn connected to one side of voltage dividing resistor 57. Electrodes 39 and 39' are connected together at terminal 59 which is in turn connected to the other side of voltage dividing resistor 57. Voltage dividing resistor 57 is center tapped and is connected to the postive side of battery 61 which causes the electrodes to be biased positive. The negative side of battery 61 is connected to conductor 63 which connects battery 61 to the heating circuit.

Figure 3:
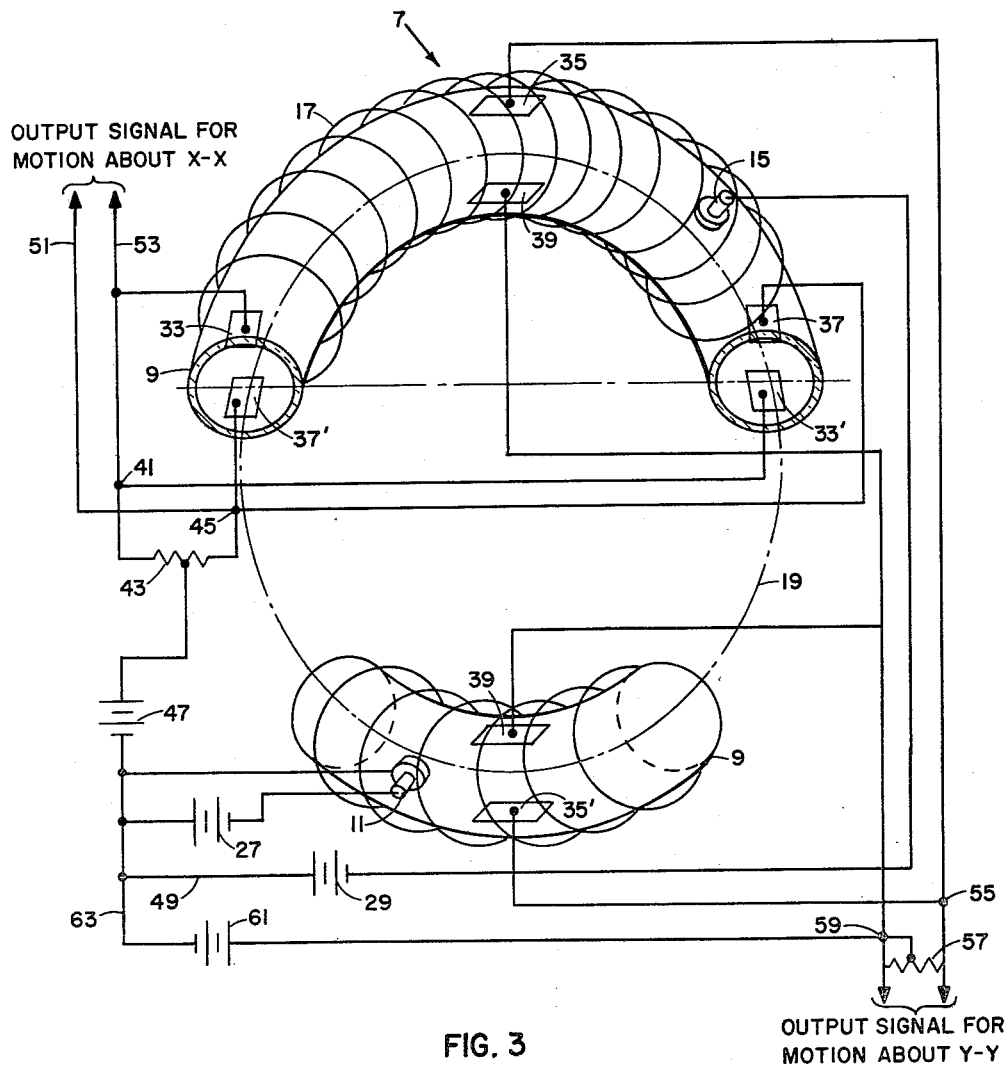
FIGURE 3 is a perspective view, partly broken away, of the gyroscope.
Figure 4:
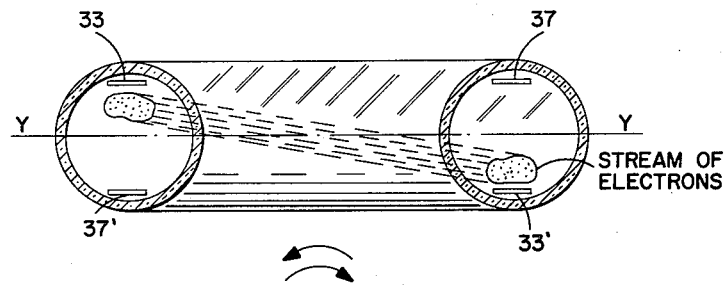
FIGURE 4 is a sectional view of the toroid along the line Y—Y of FIGURE 2.
Figure 5:
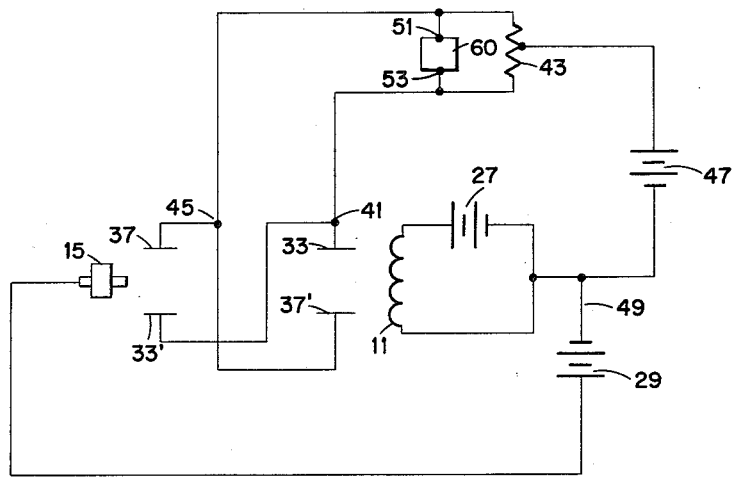
FIGURE 5 is a schematic diagram of a bridge circuit used in the invention.

For purpose of clarity in explaining the operation of the electron gyroscope only two parts of electrodes are used and they are shown in FIGURES 3, 4, and 5.

After a pool of mercury has been placed within the toroid and the toroid has been hermetically sealed, the electron gyroscope is ready for electrical connection to be made operational. Heater coil 11 is energized and the toroid is positioned so that the mercury will be in a pool around the coil. The heat generated by the heater coil causes the mercury to expel electrons and ions. A voltage is then applied between the heater 11 and the accelerating anode 15. This voltage causes the electrons and ions to be drawn away from the heater and imparts a small acceleration to the particles. When three-phase source 31 is applied to the external winding 17, a rotating magnetic field is created. This magnetic field forces the electrons and ions to flow in the center of the toroid. Depending on the strength of the magnetic field, the electrons and ions will follow any movement of the toroid about the X axis or Y axis. When the magnetic field is just strong enough to keep the stream of electrons flowing in the center of the toroid, as discussed above, the gyroscope is in condition for operation. For example, this means that as the toroid is rotated about the X axis the stream of electrons will temporarily remain in the original path for a short period of time and the plates shown on the Y axis will approach closer to the stream of electrons. When the stream of electrons approaches a plate, the small positive voltage on the plate will capture some of the electrons causing a current to flow in the plate circuit in exactly the same manner as a vacuum tube can produce a grid current. The plates are connected diametrically opposite each other so that as the toroid is rotated the stream of electrons approaches two plates that are connected together, thereby, increasing he signal strength. When the gyroscope is in operation, the output signal is fed to an oscilliscope or similar means to determine the magnitude and polarity of the output signal which is indicative of the movement of the vehicle in which the gyroscope is mounted.

Obviously many modifications and variations of the present invention are possible in the light of the above teachings. It is therefore to be understood that within the scope of the appended claims the invention may be practiced otherwise than as specifically described.

The following invention is claimed:
1. An electron gyroscope comprising:
    (a) a hollow non-conductive toroid;
    (b) said toroid being hermetically sealed;
    (c) means disposed within said hermetically sealed toroid generating a cloud of electrons;
    (d) an accelerating anode disposed to said means generating electrons for giving said electrons a velocity;
    (e) means rotating said electrons in a circular path along the mean circumferential axis of said toroid; and
    (f) means disposed within said toroid determining when said electrons deviate from the mean circumferential axis.
2. The device as set forth in claim 1, wherein said means rotating said electrons in a circular path along the mean circumferential axis of said toroid comprises:
    (a) an external winding wound on said toroid;
    (b) means, connected to the external winding, energizing said external winding so as to produce a rotating magnetic field; and
    (c) said rotating magnetic field applying a magnetic force to said electrons to cause said electrons to rotate in a circular path along the mean circumferential axis of said toroid.
3. The device as set forth in claim 2, wherein said means energizing said external winding comprises a three phase alternating current source electrically connected to the external winding.
4. The device as set forth in claim 1, wherein said means generating a cloud of electrons comprises:
    (a) an electron emission element which will emit electrons when heated; and
    (b) means, connected to the element, heating said element.
5. The device as set forth in claim 4, wherein said electron emission element is mercury.
6. The device as set forth in claim 4, wherein said means heating said element comprises:
    (a) a heating coil disposed within said hermetically sealed toroid; and
    (b) a source of potential connected to said coil so as to produce a current flow through said coil.
7. An electron gyroscope comprising:
    (a) a hollow non-conductive hermetically sealed toroid;
    (b) a heating coil disposed within said toroid;
    (c) a source of potential connected to said coil;
    (d) an electron emission means disposed adjacent said heating coil for generating a cloud of electrons when said heating coil is energized;
    (e) an accelerating anode diametrically positioned within said toroid relative to said heating coil;
    (f) a voltage source connected to said accelerating anode and said heating coil to give a velocity to said cloud of electrons;
    (g) an external winding wound on said toroid;
    (h) a voltage source connected to said external winding for producing a rotating magnetic field;
    (i) said rotating magnetic field applying a magnetic force to said electrons to cause said electrons to rotate in a circular path along the center of said toroid; and
    (j) means attached to the inner surface of said hermetically sealed toroid for producing an electrical signal when said electrons deviate from the circular path along the center of said toroid;
    (k) whereby when said toroid is rotated the electrons deviate from the center of said toroid and a signal is produced by said last mentioned means.
8. The device as set forth in claim 7, wherein said means for generating an electrical signal responsive to the deviation of said electrons from the center circular path comprises:
- (a) a first and a second pair of electrodes disposed within said toroid;
- (b) each pair comprising an upper and a lower electrode;
- (c) said upper electrode of said first pair disposed on a first location on the inner surface of said toroid and said upper electrode of said second pair disposed on a second location on the inner surface of said toroid 180° from said upper electrode of said first pair;
- (d) said lower electrode of said first pair disposed in spaced relationship and directly below said upper electrode of said second pair and said lower electrode of said second pair disposed in spaced relationship and directly below said upper electrode of said first pair;
- (e) resistor means for electrically connecting said first and said second pairs of electrodes in a balanced bridge circuit;
- (f) means connected to said resistor means placing a positive potential bias on said electrodes; and
- (g) means connected to said electrodes and said resistor means taking an output signal from said bridge circuit so as to determine which pair of electrodes has the greatest potential thereon.

References Cited by the Examiner
UNITED STATES PATENTS

| | | | |
|---|---|---|---|
| 2,330,849 | 10/43 | Smith | 313—62 |
| 2,871,703 | 2/59 | Walker | 74—5.34 |
| 2,885,552 | 5/59 | Anderson | 328—235 |

BROUGHTON G. DURHAM, *Primary Examiner.*